Figure 1:
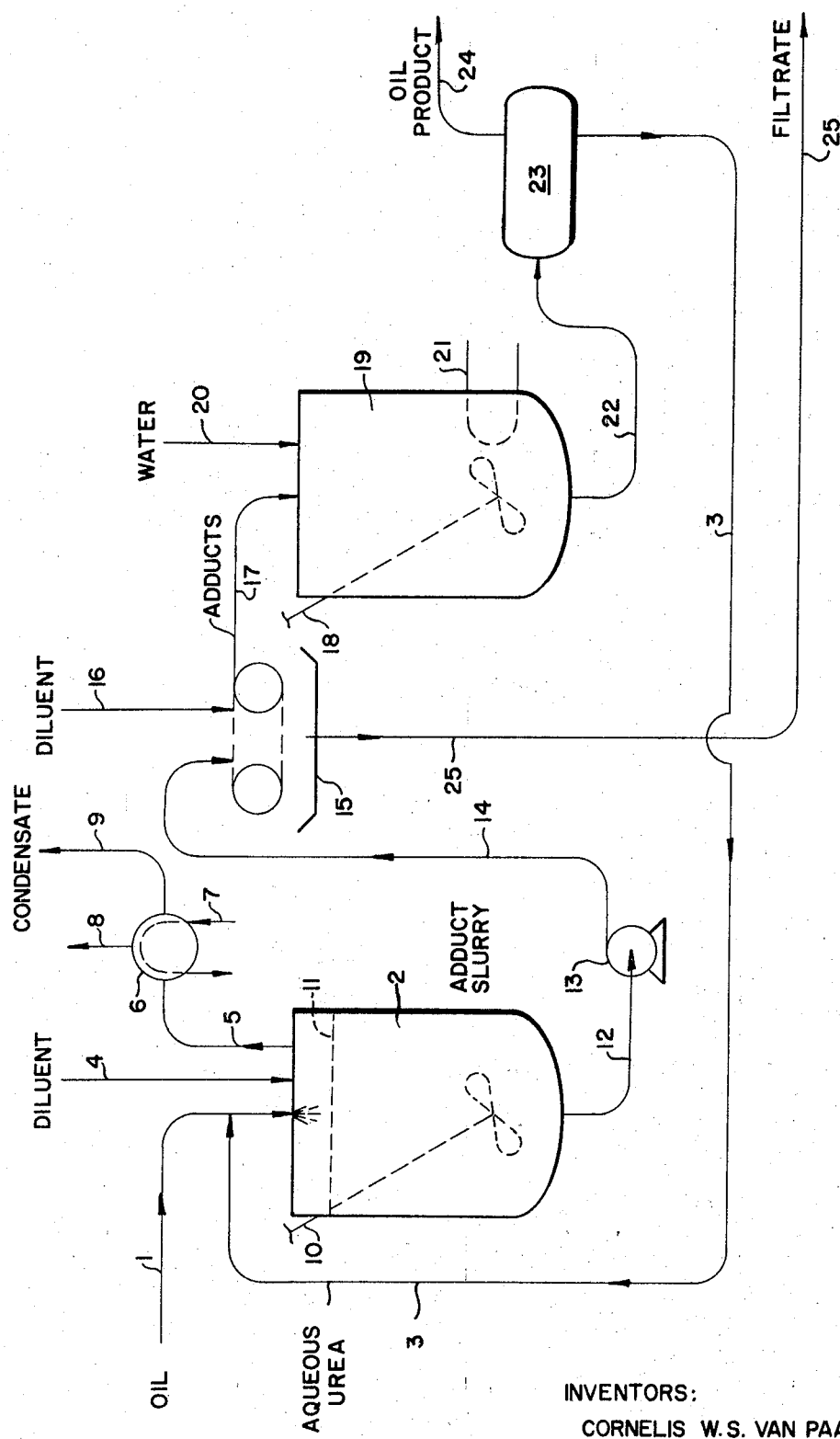

United States Patent
Van Paassen et al.

[15] 3,644,201
[45] Feb. 22, 1972

[54] EVAPORATION OF WATER DURING UREA ADDUCT FORMATION

[72] Inventors: Cornelis W. C. Van Paassen, Hague; Hubrecht C. A. Van Meurs, Amsterdam, both of Netherlands

[73] Assignee: Shell Oil Company, New York, N.Y.

[22] Filed: Dec. 5, 1969

[21] Appl. No.: 882,791

[30] Foreign Application Priority Data
Dec. 16, 1968 Netherlands..........................6,818,024

[52] U.S. Cl..............................208/308, 208/25, 260/96.5
[51] Int. Cl. ........................................................C07b 21/00

[58] Field of Search.............................209/25, 308; 260/96.5

[56] References Cited

UNITED STATES PATENTS 2,862,868  12/1958  Brown et al..............................208/25

*Primary Examiner*—Herbert Levine
*Attorney*—Harold L. Denkler

[57] ABSTRACT

Extractive crystallization separation process in which adduct formation and concentration of an aqueous solution of the adduct-forming agent are simultaneously performed in the same reaction zone.

9 Claims, 2 Drawing Figures

EVAPORATION OF WATER DURING UREA ADDUCT FORMATION

This invention relates to an improved extractive crystallization separation process. More particularly it relates to such a process wherein the adducting solution is concentrated by evaporization in the adduct-forming zone which is maintained at a low pressure.

It is known to the art that a liquid mixture may be separated by treating it with an aqueous solution of an adduct-forming agent which forms solid adducts more readily with one or more of the components of the mixture than with one or more of the other components. Such a process generally involves the formation of solid adducts, separation of the adducts formed from the remaining components in the liquid mixture, and recovery of the adducted components by decomposition of the separated adducts. A convenient method of decomposing the adducts is by use of hot water which liberates the adducted components which are separated and recovered from the aqueous solution of the adduct-forming agent thereby formed.

Although in actual practice such a process is fairly easy to achieve and hence would seem attractive, the cost involved is rather high because the aqueous solution of the adduct-forming agent formed upon the decomposition of the adduct cannot simply be used again for treating a fresh quantity of the liquid mixture because it contains so much water that in the adducting zone it would cause the formation of sticky agglomerates of adduct particles which would be difficult to separate. Therefore, this solution must be concentrated by evaporation prior to its use in treating additional quantities of the mixture to be separated with it.

It has now been found that the costs of this process can be drastically reduced and, hence, the technical attractiveness of the process substantially enhanced by effecting the concentration of the solution of the adduct-forming agent and the adduct formation simultaneously. This is accomplished by maintaining a very low pressure in the adducting zone so that the solution of the adduct-forming agent is concentrated by evaporation during the adduct formation. In contrast with known procedures, the process according to the present invention does not require a separate evaporating device, because concentration by evaporation and adduct formation are effected in the same zone. Hence, the starting material can be a solution of adduct-forming agent of any concentration desired, either saturated, or unsaturated.

Because the solution of the adduct-forming agent can be evaporated to a very high concentration, it is possible by the process of the invention to convert a very large part of the adducting agent into adducts. Moreover, it has been found that this high yield can be attained in a relatively short time, thereby further enhancing the technical attractiveness of the present process. A further advantage of this invention is that the heat present in the water vapor evaporated in the adducting zone can be used to decompose the solid adducts thereby reducing utilities requirements.

The present invention also permits the use of relatively inexpensive, low vapor pressure diluents, if desired, to reduce the viscosity of the mixture to be separated and correspondingly shorten conversion times. Heretofore more expensive high vapor pressure diluents such as dichloromethylene were frequently employed in these separation processes.

In principle, the process according to the invention allows the application of any water-soluble material that is capable of forming solid adducts with certain other substances. Materials that are known as such are certain metal chlorides, such as antimony trichloride, and also urea or its substitution products and derivatives. Compounds that are particularly suitable for application in the process according to the invention are urea and thiourea (pure or otherwise). Urea is a particularly advantageous adduct-forming agent because of its solubility in water. Urea is generally applied mixed with biuret or any biuret formed during the process.

Application of urea as adduct-forming agent in the process according to the invention allows maintaining a relatively high temperature in the adducting zone. This makes it possible to condense the vapors originating from the boiling urea solution by means of heat exchange with a cooling agent at a temperature substantially equal to or higher than ambient temperature and at a pressure that is at least substantially equal to the pressure maintained in the adducting zone. The heat exchange may be direct or indirect. The cooling agent can be, for example, air or cooling water. Preferably, the condensate formed from the vapors is reused in the process, for example, for the recovery of urea in aqueous solution in the decomposition zone.

In general, the vapor in question may contain, in addition to water, a small quantity of evaporated mixture components and/or vapor of any diluent that may have been added to the mixture to be separated.

The cost of the process according to the invention can be reduced even further by using the heat of the vapors originating from the boiling solution of adduct-forming agent for the recovery of the aqueous solution of adduct-forming agent.

For this purpose, it is possible to pass vapor, or at least part of the vapor, from which heat must be withdrawn, into one or more zones in which the recovery is effected and in which the heat can be withdrawn from the vapor by means of indirect heat exchange (if required, with the aid of a plurality of heat exchangers connected in series, in parallel or in a combination of these). Preferably, however, this withdrawal is effected by compressing the vapors originating from the boiling solution of adduct-forming agent and by withdrawing at least part of the heat by means of direct heat exchange from the compressed vapors. This makes it possible to condense at least part of the vapor with water and to use this water, for instance, for recovery of adduct-forming agent. Preferably, however, a quantity of compressed vapor from which heat must be withdrawn, is brought into direct heat exchange with the separated adducts. This preferred embodiment of the present process means a considerable saving in heat expenses because the heat of condensation of the vapor, or at least a substantial part of it, will contribute towards the heat required for the decomposition of the adduct.

For the application of urea as adduct-forming agent, the temperature maintained in the adducting zone is preferably between about 30° and about 70° C. and in particular between about 45° and about 60° C. At these relatively high temperatures the yields of urea adducts are still comparatively high. An additional advantage of applying these relatively high temperatures is that the formation of adducts is more selective with the relatively easily adductable compounds. Of course, this process can also be carried out at a lower temperature, for instance, between 15° and 30° C., in which case it is recommended that the evaporated water be compressed, as has been explained hereinbefore.

The pressure in the adducting zone must be so low that the solution of adduct-forming agent present in this zone boils. For instance, the pressure may be at most 85.5 mm. Hg if a solution of urea is introduced into an adducting zone in which a temperature of 60.3° C. is maintained, or 36.5 mm. Hg if this temperature is 40.0° C.

In the present process, process, the aqueous solution can, in principle, be concentrated by evaporation to any concentration desired. Preferably, the evaporation of the solution of adduct-forming agent is continued until a suspension of adduct-containing grains has been formed. Each grain contains fine adduct particles kept together by the solution of adduct-forming agent which serves as a binding agent for the adduct particles. These grains can very easily be processed to larger and harder pellets in a pelletizer, if desired. The hard pellets formed in this device can be freed from liquid on a simple sieve, for instance, a vibrating screen or screen belt filter, after which they are generally washed with a diluent. After having been washed, the pellets will contain only a small quantity of nonadductd compounds. The liquid used for washing the adducts will for the most part be left in the remaining liquid as will any excess of the mixture to be separated.

Evaporating the solution of adduct-forming agent may be continued until the solution has lost practically all its water. In this case, however, the adducts no longer form grains, but fine particles. These fine particles may be isolated in any suitable manner, for instance with the aid of one or more hydrocyclones or centrifuges. It is also possible to pass the fine particles together with the remaining liquid into a pelletizer and to process these particles to pellets after the addition of a binding agent, for instance a quantity of water or of a solution of adduct-forming agent.

As has been mentioned above, the adducts formed are isolated from the remaining components of the mixture. The adducts can be used for a number of purposes. Usually, the adducts are decomposed into their component parts, namely into the adduct-forming agent and mixture components; however, the adducts can also be applied for other purposes, for instance, as constituents of fertilizers.

Solid adducts may be decomposed by any of a number of methods known in the art, for instance, by heating them or by contacting them with liquid ammonia. For the purpose of the invention, a particularly advantageous method of decomposing the solid adducts involves heating them with water which results in the formation of an aqueous solution of adduct-forming agent and a liquid phase containing the adducted compounds. In accordance with the invention the aqueous solution thus formed is used for treating a fresh quantity of the liquid mixture without being concentrated beforehand. Hence, the solution recovered is recycled to the adducting zone without prior concentration by evaporation.

The heat required for concentrating the aqueous solution by evaporation can be supplied by the heat released during the adduct formation or by increasing the temperature(s) of the diluent and/or of the mixture to be separated and/or of the liquid recycled to the adducting zone. An additional advantage of the process according to the invention is that the quantity of evaporated water can also be controlled by adjusting the pressure in the adducting zone. For instance, if the pressure is reduced the solution of adduct-forming agent will be further concentrated by evaporation which will cause the temperature in the adducting zone to become lower.

The adduct-forming agent may be applied in a quantity greater than, equal to, or smaller than the amount stoichiometrically required to adduct all the relatively easily adductable compounds present in the starting mixture. As a rule a quantity is applied that is larger than the stoichiometric amount.

If the liquid mixture to be separated has a relatively low viscosity, it can be passed into the adducting zone without being diluted. However, since the mixtures to be separated frequently have a relatively high viscosity, a diluent is commonly introduced into the adducting zone. In principle, any suitable diluent can be applied. The heat released in the formation of adduct is removed, at least in part, by the evaporation of water. Hence, in the process according to the invention the diluent applied should have a vapor pressure lower than the pressure maintained in the adducting zone. Therefore, it is not necessary to use volatile diluents, such as dichloromethane or the like which are conventionally used for this purpose.

The diluent can be such that it dissolves the mixture to be separated (under the process conditions), but it is also possible that it dissolves either those components that form adducts relatively easily, or the other components which do not.

The diluent can be introduced into the adducting zone in any suitable manner, for instance separately or with the liquid mixture to be treated, dissolve in it. It is also possible to pass the diluent into the adducting zone together with the mixture to be separated and the solution of the adduct-forming agent in water.

The quantity of solid material per unit of volume of liquid present in the adducting zone can be adjusted by controlling the quantity of diluent that is passed into the adducting zone. The quantity of solid material can also be adjusted by recycling part of the mixture components remaining after the separation of the adducts to the adducting zone. The mixture components that are recycled may be dissolved in a diluent, if desired. Such a recycle is particularly important if the liquid mixture to be separated has a comparatively high content of relatively easily adductable compounds (e.g., 40 percent W.). The liquid that is not recycled to the adducting zone can be treated in any suitable manner, for instance, it can be separated into nonadducted compounds and diluent by means of distillation. The diluent recovered may be used again in the process, if desired.

Good contact between the solution of adduct-forming agent introduced into the adducting zone and the mixture to be separated is of course beneficial for the rate at which the adducts are formed. Two measures promoting this contact are described hereinafter.

The first measure consists of introducing the solution of adduct-forming agent into the adducting zone in admixture with the mixture to be separated, for instance, by injecting it into the adducting zone. The adducts are formed at an even higher rate if the solution of adduct-forming agent is atomized into the adducting zone. The solution of adduct-forming agent may be atomized separately, but preferably it is atomized together with the mixture to be separated. Atomization can be effected by applying a pressure difference between about 5 and 50 kg./cm.$^2$.

The second measure consists in keeping the adducts and liquid present in the adducting zone in motion. This enhances rapid evaporation of the solvent of the adduct-forming agent present in the adducting zone and correspondingly increases the rate of adduct formation. This keeping in motion can be effected in a variety of ways, for example, with the aid of a mechanically driven stirrer.

Another advantage of the process according to the invention is that it gives a high yield of adduct within a relatively short time, usually in less than 30 minutes. If the two measures mentioned above are applied, a high yield of adduct is obtained in less than 10 minutes, normally within 1 to 5 minutes. In this connection the term "yield of adduct" is taken to mean the percentage of relatively easily adductable compounds in the mixture to be separated that is present in the solid adducts separated.

The present process can be applied to a variety of mixtures of organic compounds provided that under the conditions applied, they contain both adduct-forming components and components which do not readily form adducts. These mixtures may contain, for instance, hydrocarbons (either substituted or unsubstituted) or compounds other than hydrocarbons, such as alcohols, carboxylic acids and the like. Mixtures that are particularly suitable for treatment with urea or thiourea are those containing straight-chain hydrocarbons in combination with other hydrocarbon types. Urea, for example, readily forms adducts with straight-chain hydrocarbons but does not form adducts easily with other types of hydrocarbons. If thiourea is used the reverse applies. The process according to the invention is particularly suitable for treating mixtures that contain paraffinic straight-chain hydrocarbons in addition to other hydrocarbons. In this case it is preferred to use as the diluent kerosenes and light gas oils, for instance, a hydrocarbon oil boiling between 150° and 250° C. Very high yields of adduct are obtained if the diluent applied is a hydrocarbon fraction containing straight-chain paraffins and aromatics, whether or not mixed with cyclo-aliphatic hydrocarbons. Important advantages attending the use of hydrocarbons as diluents are that, unlike dichloromethane, they are not corrosive and that they have a relatively low heat of evaporation. The latter advantage is clearly demonstrated by the fact that relatively little heat is required to separate the last-mentioned hydrocarbons from remaining mixture components.

Suitable hydrocarbon mixtures are, for instance, those obtained by means of a cracking process, whether or not carried out in the presence of hydrogen, in particular a (heavy) cycle oil. Another example is a raffinate obtained by bringing such an oil into contact with a solvent selective for aromatics, such as furfural; other examples are straight-run petroleum fractions obtained by single-stage or multistage distillation, in particular gas oils and high-boiling waxy distillates, which are obtained by means of vacuum distillation, such as can be obtained, for instance, from crude oils. (The term straight-run fractions is taken to refer also to wax-containing fractions from which part of the wax or part of the nonwax has been removed in some way or other, such as a partly dewaxed oil or an oil-containing wax, such as slack wax).

The process according to the invention is particularly suited for the preparation of gas oils and lubricating oils with low pour point.

The process according to the invention will now be further described with reference to the drawing, comprising FIGS. 1 and 2, in which pumps, valves, storage vessels, instruments and other ancilleries have in general been omitted.

FIG. 1 shows an embodiment of the process according to the invention wherein a waxy hydrocarbon oil is treated with an aqueous urea solution. Condensation of the vapor exhausted from the adducting zone is accomplished in a condenser.

Oil via line 1, together with an aqueous solution of urea via line 3, is passed to reactor 2 (in the case outlined a stirred vessel, but if desired another contacting device, or a system consisting of more than one reactor) through an atomizing nozzle under pressure, for instance, under the influence of a pressure difference between 5 and 50 kg./cm.$^2$. In the case outlined the diluent is introduced separately via line 4 into reactor 2. In reactor 2 (the adducting zone) adducts are formed between urea and paraffinic oil components containing straight chains. Via line 5 connected to reactor 2, such a low pressure is maintained in the reactor that the urea solution in the reactor boils and is concentrated by evaporation. The vapors formed during concentration by evaporation are conducted through condenser 6 in which they are cooled by means of indirect heat exchange with cooling water at ambient temperature supplied via line 7 and in which they are for the greater part condensed. The noncondensed vapors are drawn off via line 8, the condensate formed is discharged via line 9. The condensate may contain a small quantity of diluent which can easily be separated from the water in a settler. Reactor 2 is provided with a stirrer 10, which keeps the adduct-containing slurry present in the reactor (the level of which is indicated by a dotted line) in motion. Above this level a gas phase is present into which the starting mixture and the urea solution are atomized. Of course, the starting mixture and urea solution may also be atomized below this level. The temperature in reactor 2 may be adjusted, for instance, by adjusting the temperature of the liquid supplied via lines 1, 3 and/or 4 and/or the pressure maintained via lines 5 and 8.

The adduct-containing slurry obtained in reactor 2 is conducted via line 12 with the aid of pump 13 and via line 14 to an adduct-separator 15 (in this case a screen belt filter but, if desired, another type of filter, another type of separator, such as one or more centrifuges or hydrocyclones, or a group of at least two separating devices). During the separation the adducts are washed with a diluent supplied via line 16 to remove any adhering oil. Of course, the adducts may also be washed after they have been separated.

The washed adducts are conducted via line 17 to an adduct-decomposing zone which in this case comprises decomposing vessel 19, which is provided with stirrer 18. In vessel 19 the adducts are brought into contact with water supplied via line 20 (if required, completely or partly recycled from line 9). The pressure in vessel 19 may be, for instance, atmospheric. The heat required for decomposition may be supplied in any suitable manner, for instance, by a high temperature of the water supplied via line 20 and/or by supply via a heating device 21 which can be operated on, for instance, steam or water. Instead of water, steam or a mixture of steam and water may be passed into vessel 19 via line 20. Via line 22 a liquid mixture is discharged from vessel 19, which mixture is separated in settler 23 into an aqueous urea solution, which is discharged via line 3, and an oil phase, which is discharged via line 24. Fresh urea solution and/or solid urea may be supplied, if required. Likewise, urea solution may be withdrawn from the system.

The filtrate formed in adduct-separator 15 contains the compounds that have not been adducted in reactor 2 dissolved in diluent and is discharged via line 25. This filtrate may be fractionated in a stripper (which is not shown in the drawing) into a top fraction which consists, at least mainly, of diluent and a bottom fraction which is at least substantially free of diluent and consists at least for the greater part of paraffins. The top fraction can be used again, if required, by recycling it via line 4.

Figure 2:
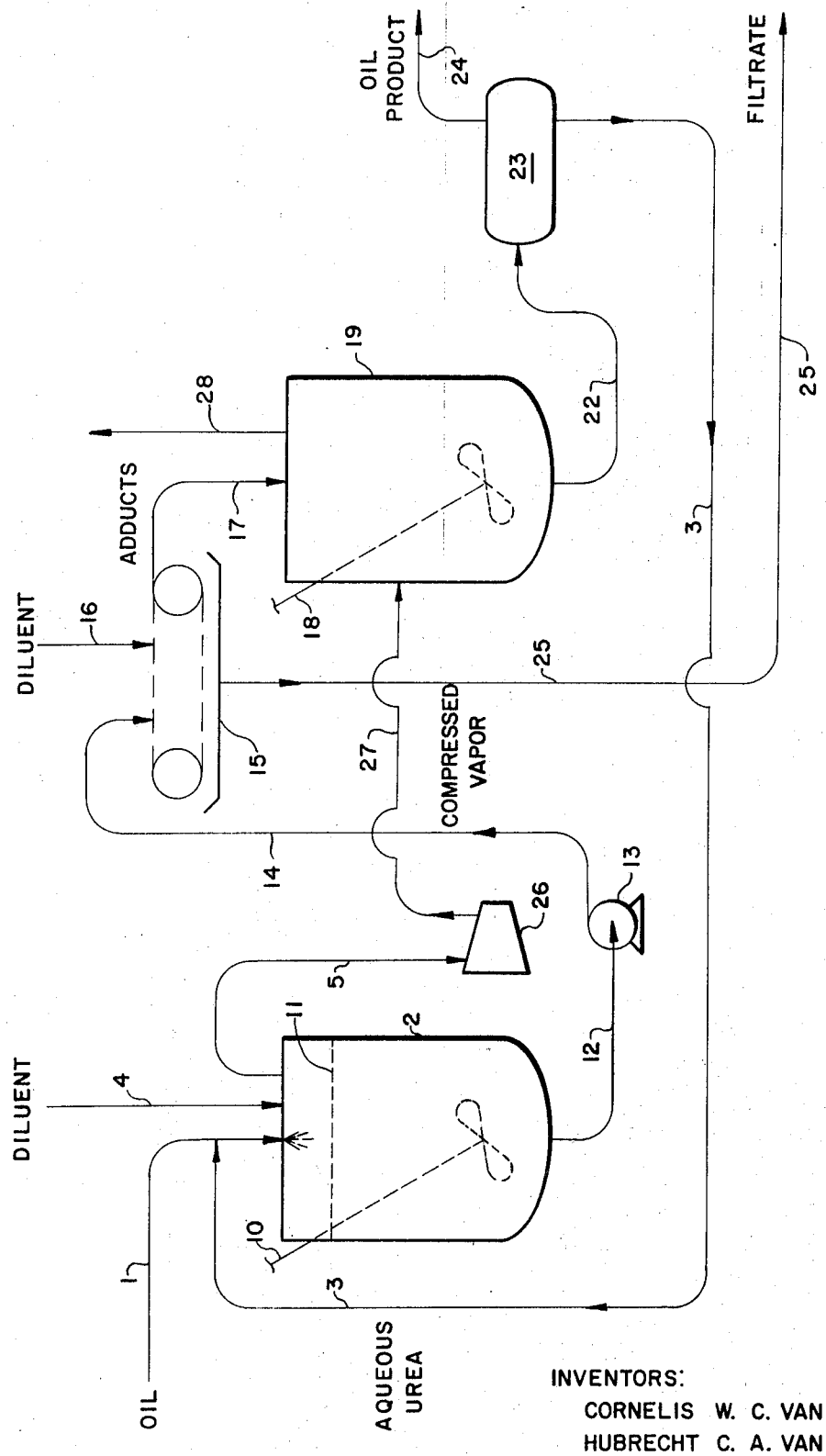

FIG. 2 illustrates the principle of treating a wax-containing hydrocarbon oil, employing another embodiment of the process according to the invention in which the water vapor drawn off from the reactor, after having been compressed, is used for decomposition of the adduct. Items 1–25 (insofar as they are present) serve the same purpose as those discussed in connection with FIG. 1. The present embodiment differs from the one outlined in FIG. 1 in that the vapors drawn off via line 5 are compressed with the aid of compressor 26 and the compressed vapors are conducted via line 27 into decomposing vessel 19 in which, according to the invention, they are brought into direct contact with the adducts. The temperature in vessel 19 is, for instance, between 80° and 90° C. As said compression can produce more heat than is needed to maintain the temperature required in vessel 19, heat can be withdrawn from this vessel, if required. For this purpose vessel 19 can be provided with, for instance, a cooling coil (which is not shown in the figure). The compressed vapors supplied via line 27 can also be somewhat cooled and be partly condensed beforehand. Another possibility is to condense the vapors produced in vessel 19 and to recycle the condensate formed in the vessel, if required.

If as in the case outlined, the pressure prevailing in vessel 19 is lower than atmospheric, vapors can be drawn off from this vessel via line 28 and may be partly condensed and the condensate formed used again for the process.

The process according to the invention will be further illustrated with the aid of the following examples.

EXAMPLE I

The starting material was a hydrocarbon distillate having a boiling range of from 350° to 480° C. and containing 43% w. of relatively easily adductable compounds. This distillate was dissolved in 30 parts by volume of kerosene with a boiling range of from 160° to 220° C. The kerosene contained 23% w. of n-alkanes, 56% w. of isoalkanes plus cycloalkanes, and 21% w. of aromatic hydrocarbons. The dissolved starting material was mixed with 2.20 parts by volume (calculated on the starting material) of an aqueous urea solution that was saturated at 60° C. and the mixture (having a temperature of 70° C.) was atomized under an excess pressure of 43 kg./cm.$^2$ through narrow openings into the upper part of an adducting vessel in which a pressure of 3 cm. Hg was maintained with the aid of an exhaust system. The vessel had a capacity of 40 liters and was cylindrically shaped, with a diameter of 30 cm. and had a conical bottom provided with an outlet. The temperature in the vessel was 56.5° C.

The urea solution was concentrated by evaporation to the point that the suspension of adduct present in the vessel contained granular adducts. The adducts were filtered off, washed with light spirit, again suspended in a fresh quantity of light spirit, filtered and washed. After the adducts had washed and dried, weighing revealed that 74.5 percent of the adductable compounds present in the original distillate had been adducted.

EXAMPLE II

The experiment described in Example I was repeated with the difference that the pressure in the adducting zone was 2 cm. Hg, the temperature in the vessel 51° C. and the dissolved starting material was mixed with 2.39 parts by volume (calculated on the starting material) of an aqueous urea solution that was saturated at 50° C. In this case the yield of adduct was 74 percent.

EXAMPLE III

In the experiment described in this example the same starting material and the same diluent was used as mentioned in Example I. This starting material (having a temperature of 80° C.) was mixed with 2.59 parts by volume of an aqueous urea solution that was saturated at 70° C. and the mixture was injected under an excess pressure of 1 kg./cm.² into the upper part of an adducting vessel in which a pressure of 4 mm. Hg was maintained with the aid of an exhaust system. In this case the diluent was introduced separately into the vessel in a quantity of 20 parts by volume per part of volume of starting material. The vessel had a 1.5-liter capacity and was provided with a mechanically driven stirrer. The temperature in the vessel was 50° C.

The starting material was introduced into the vessel within a short time, after which it was allowed to remain there for another 69 minutes. The adducts present in the vessel were granular and after they had been isolated in the way described in Example I, the yield was found to be 88.5% w.

EXAMPLE IV

In a unit as outlined in FIG. 1, 1 kg. per hr. of the distillate mentioned in Example I having a temperature of 80° C. was mixed with 1 kg. per hr. of an aqueous urea solution. The aqueous solution had a temperature of 85° C. and contained 71.5 g. urea per 100 g. solution. The pressure in the reactor was maintained at 6 cm. Hg and the temperature of the suspension in the reactor was 50° C. The quantity of adduct discharged from the reactor in the adduct-containing suspension was 0.542 kg. per hr. The quantity of water vapor exhausted from the reactor was 0.137 kg. per hr.

After the adducts had been separated and washed with kerosene they were decomposed with water having a temperature of 85° C., which resulted in the formation of an oil phase containing 0.128 kg. of adductable compounds. Hence, the yield of adduct was 29.8 percent calculated on relatively easily adductable compounds.

EXAMPLE V

In a unit as outlined in FIG. 2 a mixture of 5 kg. of the distillate mentioned in Example I having a temperature of 77° C. and 18.2 kg. of an aqueous urea solution (containing 13 kg. urea) having temperature of 80° C. was introduced into the adducting vessel described in Example I. All the quantities mentioned are expressed in kg. per hr. The diluent, kerosene with a composition similar to the one mentioned in Example I, was introduced into the adducting vessel in a quantity of 25 kg. The pressure in the adducting vessel was 7 cm. Hg and the temperature 55° C. The residence time in the vessel was 30 minutes.

The adduct suspension discharged from the adducting vessel was processed in a pelletizer to a suspension containing relatively hard grains, after which these grains were separated on a sieve and washed with kerosene. Subsequently, the isolated grains were decomposed in a decomposition vessel by contacting them at 85° C. and 23 cm. Hg with steam that had been exhausted from the adducting vessel and that had been compressed to 23 cm. Hg. The liquid mixture formed upon this decomposition was separated into 2.0 kg. of adductable compounds and 18.2 kg. of aqueous urea solution. Hence, the yield of adductable compounds was 93 percent, calculated on relatively easily adductable compounds present in the starting mixture. Without having been concentrated by evaporation, the aqueous urea solution was mixed with a fresh quantity of the distillate to be separated and the resulting mixture was passed into the adducting vessel so as to be brought into contact with a fresh quantity of distillate.

We claim as our invention;

1. In a process for the separation of a liquid organic mixture by contacting said mixture with an aqueous solution of urea or thiourea which is capable of forming solid adducts with at least one of the components of said mixture, separating the solid adducts formed thereby from the remaining components of the mixture and decomposing said adducts to recover the adducted components; the improvement which comprises contacting said liquid mixture and said aqueous solution of urea or thiourea in an adducting zone which is maintained at a temperature between 30° C. and about 70° C. and at such a low pressure that the aqueous urea or thiourea solution boils and is concentrated by evaporation of water in the adducting zone.

2. The process of claim 1 wherein the liquid mixture to be separated comprises essentially straight-chain paraffinic hydrocarbons mixed with other hydrocarbon types.

3. The process of claim 1 wherein a diluent is introduced into the adducting zone, said diluent being selected from the group consisting of kerosene and light gas oils.

4. A process for the separation of a liquid mixture containing straight-chain and branched-chain paraffinic hydrocarbons which comprises:
   1. contacting said mixture with an aqueous solution of urea in the presence of a kerosene diluent in an adducting zone which is maintained at a temperature between about 30° C. and about 70° C. and at such a pressure that the aqueous solution of adduct-forming agent boils and is concentrated by evaporation of the water.
   2. passing the resulting adduct-containing slurry to an adduct separation zone wherein the solid adducts are substantially separated from the nonadducted hydrocarbons,
   3. passing the separated adducts to a decomposition zone and contacting the same with water or steam under such conditions that decomposition occurs and two liquid phases are formed,
   4. passing the two liquid phases from step (3) to a settling zone wherein the aqueous urea phase is recovered and recycled to the adducting zone without prior concentration and the paraffin phase is drawn off and recovered as the product of the process.

5. The process of claim 4 wherein vapors resulting from the concentration of the aqueous urea solution in the adducting zone are compressed and at least part of the heat is withdrawn from the compressed vapors by means of direct heat exchange.

6. The process of claim 4 wherein the vapors resulting from the concentration of the aqueous urea solution in the adducting zone are condensed by means of direct or indirect heat exchange with a cooling agent and are used for the recovery of urea in aqueous solution.

7. The process of claim 4 wherein the hydrocarbon mixture and aqueous urea solution are mixed and subsequently atomized into the adducting zone.

8. The process of claim 5 wherein part of the compressed vapor from which the heat is to be withdrawn is brought in direct heat exchange with the separated adducts.

9. The process of claim 4 wherein the temperature in the adducting zone is maintained at between about 45° C. and 60° C.

* * * * *